с

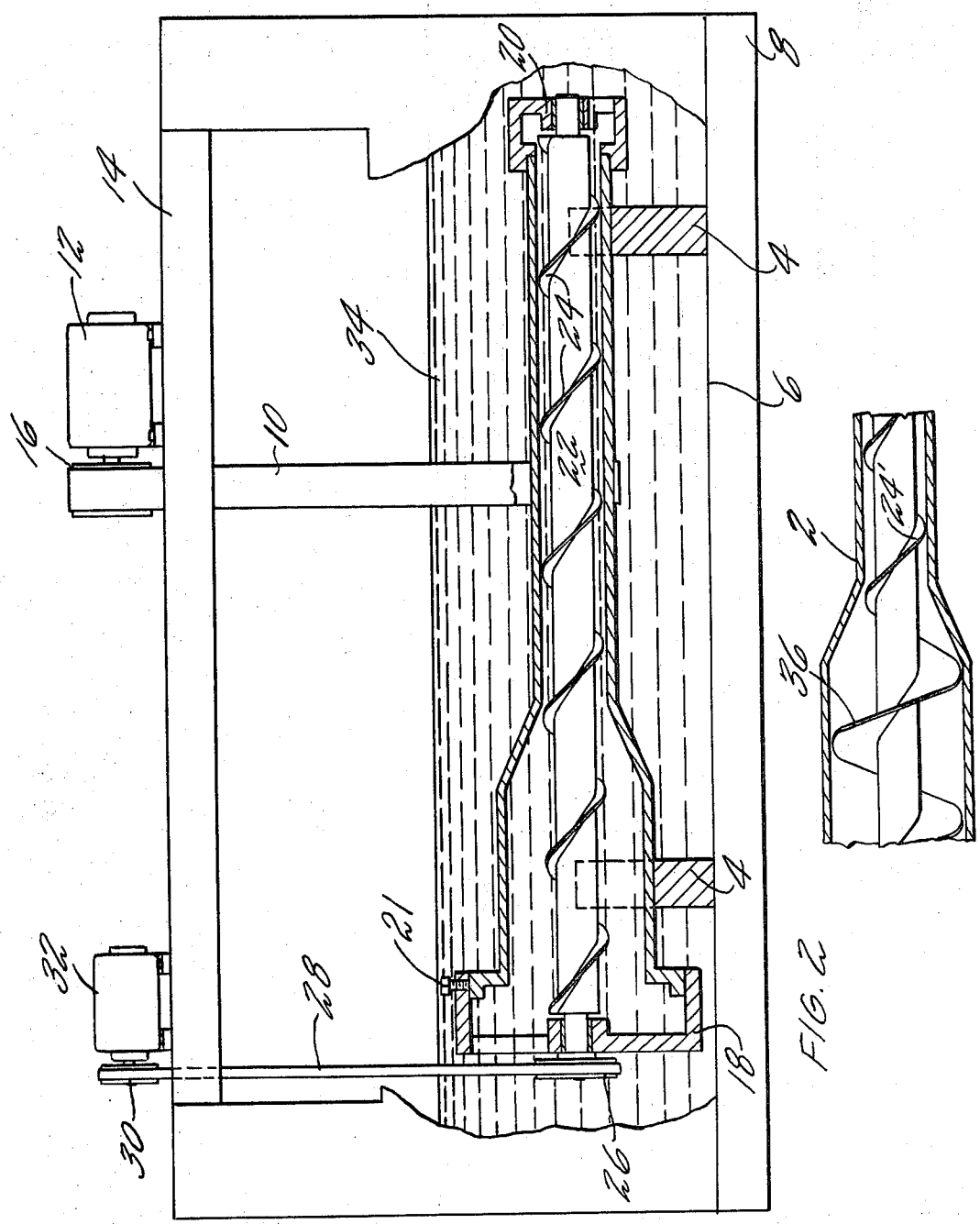

United States Patent Office 3,700,509
Patented Oct. 24, 1972

3,700,509
APPARATUS AND METHOD FOR CHEMICALLY MILLING THE INNER WALL SURFACE OF A HOLLOW SHAFT
John P. Devitt, Wethersfield, Conn., assignor to United Aircraft Corporation, East Hartford, Conn.
Filed Apr. 5, 1971, Ser. No. 131,322
Int. Cl. C23f 1/00, 3/04
U.S. Cl. 156—5                                   8 Claims

ABSTRACT OF THE DISCLOSURE

A method and apparatus for chemically milling the inner wall of a hollow shaft to the desired dimension by flowing an etchant through said shaft as by a helix rotating within the shaft and guiding the etchant against and over the inner wall surface of the shaft from one end to the other. The helix may be contoured substantially to the shape of the finished wall surface to more precisely control the etching operation.

BACKGROUND OF THE INVENTION

In machining the inner surface of the long hollow shaft, the tool must be carried on a bar extending inwardly from one end of the shaft. Long shafts result in a long overhang that deflects during the machining unless the tool can also be supported by the surface being machined, and the deflection of the shaft introduces errors in the machining and an inaccurate machining operation. Other known techniques have proven to be too costly and usually not accurate enough for shafts that in use must rotate at high speeds and transmit high loads.

SUMMARY OF THE INVENTION

One feature of the invention is an apparatus for chemically milling or etching the inner surface of a long hollow shaft to the desired dimension in a reasonable time. Another feature is the method of chemically milling the shaft to the desired internal dimensions and contours thereby eliminating to a great extent the mechanical removal of material from the shaft.

According to the present invention, the apparatus provides for rotating the shaft to be machined in a direction opposite to a helix positioned within the shaft. The rotation of the helix provides for a circulation of an etchant through a shaft from one end to the other and by its action urges the flow of the etchant along the inner wall of the shaft. With the helix contoured substantially to dimensions corresponding to the finished dimension of the shaft the action of the etchant will produce a shaft substantially to the required internal dimension or wall thickness.

BRIEF DESCRIPTION OF THE DRAWINGS

FIG. 1 is a schematic of an apparatus embodying the invention and for carrying out the method of the invention.

FIG. 2 is a fragmentary view of a detail showing a modification.

DESCRIPTION OF THE PREFERRED EMBODIMENT

Referring to FIG. 1, the shaft 2 to be machined internally to a selected contour and dimension is positioned on spaced bearings 4 in a tank 6 in the base 8 of a machine. The shaft 2 is rotated by a belt 10 extending from a motor 12 on a table 14 forming part of the machine. The motor has a pulley 16 for the belt 10 and the shaft itself serves as the pulley within the tank.

The shaft has open end caps 18 and 20 removably secured to the shaft as by bolts 21 and these caps serve as bearings for a rod 22 carrying on its periphery a helix 24. The end of the rod 22 outwardly of cap 18 carries a pulley 26 driven by a belt 28 from pulley 30 on a motor 32 also on table 14.

The tank is filled at least to a level above the inner wall surface of the shaft with a suitable etchant 34. Such etchants are well known and do not need description here; the alloy of the shaft to be machined or etched determines the particular etchant used.

In use, the shaft is positioned as shown with the helix positioned therein. The arrangement is such that the caps and helix may be placed in position in and on the shaft before the assemblage is placed in the tanks. When the etchant is in the tank and the shaft and helix are in position and they are rotated in opposite directions to one another, the action of the helix causes the etchant to flow through the shaft from one end to the other to cause an etching or milling action over substantially the entire shaft surface. The helix also carries any of the sludge formed by the milling action away from the surface being milled and to be deposited in the bottom of the tank.

Where the inner surface of the shaft varies in dimension from one end to the other, it may be desirable to make the peripheral surface of the helix conform substantially to the finished shape of the shaft as shown in FIG. 2. Thus, the helix 24' of this figure is in the form of a deeper helical flange 36 at a point where the internal dimension of the shaft is greater. It will be understood that in all events there is clearance between the peripheral surface of the helix and the inner wall of the shaft.

Obviously the outer diameter of the helix must be smaller than the unfinished diameter of the shaft in order that the helix may be inserted within the shaft prior to the machining operation and also to permit a flow of etchant between the periphery of the helix and the inner surface of the shaft. Thus, the helix is inevitably spaced from the inner wall surface of the shaft at the completion of the milling operation.

Experience with different alloys and different etchants will indicate the desirable clearance it is necessary to allow for the helix, bearing in mind that a relatively small clearance will assure more thorough contact of the etchant with the surface of the shaft which is being etched. Further the helix will desirably be made of the material that is not subject to being etched or eroded by the etchant being used on the shaft. Accordingly, it may be desirable to make the rod and the helix from a polyvinylchloride or a Teflon or the like. For strength purposes it may be desirable to have the rod and helix itself made of a metallic material with a Teflon or the like coating.

The shafts bearings may obviously be open cradle bearings to permit lowering of the assembled shaft and helix as a unit into the tank and the table 14 may be hinged or slidably mounted on the base to move it out of the way for loading the shaft assembly into the tank or removing it therefrom. Such concepts are a matter of design and are not an essential part of the invention and they are not shown or described. Further, the outer surface or selected areas of the shaft may be coated with a maskant to prevent etching of this surface.

What is claimed is:
1. Apparatus for chemically milling the interior surface of a hollow shaft including,
    a base forming a tank for etchant,
    bearing means in the base for supporting the shaft for rotation within the tank and submerged in the etchant,
    a rod extending axially through the shaft and having a helical flange on the outer surface, and means to cause relative rotation between the rod and shaft to cause a flow of etchant along the inner surface of the shaft.

2. Apparatus as in claim 1 in which the outer surface of the helix is contoured from end to end and to approximately the desired finished contour of the inner surface of the shaft.

3. Apparatus as in claim 1 in which means are provided for rotating the rod and shaft in opposite directions.

4. Apparatus as in claim 1 in which the means for supporting the rod includes end caps for mounting on opposite ends of the shaft said caps being open to permit flow of etchant therethrough.

5. The method of chemically machining the inner surface of a hollow shaft to produce the desired wall thickess in the shaft including the steps of, positioning said shaft in an etchant bath, positioning a helix withint he shaft, and flowing the etchant along the entire inner surface of said shaft from one end to the other for removing material from said surface by providing relative rotation between the helix and shaft while the latter is in the etchant bath.

6. The method of claim 5 in which the helix is contoured from end to end to approximate the finished contour of the inner surface of the shaft.

7. The method of forming a hollow shaft to the desired internal wall dimension including the steps of:
  (1) mounting the shaft for rotation in a tank filled with an etchant,
  (2) positioning within said shaft a helix extending from end to end of the shaft,
  (3) rotating said helix in a direction opposite to the shaft, and
  (4) causing by said rotation a flow of etchant through said shaft from one end to the other and along the inner wall surface of said shaft.

8. The method of claim 7 including the steps of continuing the relative rotation of the shaft and helix until the desired dimension of the inner wall surface is reached and contouring the periphery of the helix substantially to the desired shape of the inner wall surface.

References Cited

UNITED STATES PATENTS

| | | | |
|---|---|---|---|
| 2,415,729 | 1/1947 | Dana | 134—8 XR |
| 3,409,031 | 11/1968 | Benbow et al. | 134—169 C |

JACOB H. STEINBERG, Primary Examiner

U.S. Cl. X.R.

156—25, 345; 134—22, 169